(12) United States Patent
Farreyrol (10) Patent No.: US 12,128,493 B2
(45) Date of Patent: Oct. 29, 2024

(54) METHOD OF PRODUCING A VEHICLE GLASS ASSEMBLY

(71) Applicant: ACR II GLASS AMERICA INC., Nashville, TN (US)

(72) Inventor: Olivier Farreyrol, Machtum (LU)

(73) Assignee: ACR II GLASS AMERICA INC., Nashville, TN (US)

( * ) Notice: Subject to any disclaimer, the term of this patent is extended or adjusted under 35 U.S.C. 154(b) by 857 days.

(21) Appl. No.: 16/981,777

(22) PCT Filed: Feb. 27, 2019

(86) PCT No.: PCT/JP2019/007427
§ 371 (c)(1),
(2) Date: Sep. 17, 2020

(87) PCT Pub. No.: WO2019/181395
PCT Pub. Date: Sep. 26, 2019

(65) Prior Publication Data
US 2021/0121968 A1    Apr. 29, 2021

(30) Foreign Application Priority Data

Mar. 22, 2018    (GB) ..................................... 1804622

(51) Int. Cl.
*B23K 1/00*    (2006.01)
*B23K 35/26*    (2006.01)
(Continued)

(52) U.S. Cl.
CPC .......... *B23K 1/0008* (2013.01); *B23K 35/262* (2013.01); *C22C 13/00* (2013.01);
(Continued)

(58) Field of Classification Search
CPC .. B23K 1/0008; B23K 35/262; B23K 35/025; B23K 35/3006; B23K 2101/36–42;
(Continued)

(56) References Cited

U.S. PATENT DOCUMENTS 2,644,066 A * 6/1953 Glynn ...................... H05B 3/84
428/650
2,806,933 A * 9/1957 Enright ................ B23K 1/0008
219/99

(Continued)

FOREIGN PATENT DOCUMENTS

CA    2251474 A1 *  5/1999    ............... B23K 1/00
CA    2884779 A1 *  3/2014    ........... B23K 1/0016
(Continued)

OTHER PUBLICATIONS

Translation of CN-102972092-A (no date available).*
(Continued)

*Primary Examiner* — Kiley S Stoner
(74) *Attorney, Agent, or Firm* — K&L Gates LLP (57) ABSTRACT

A method of producing a vehicle glass assembly includes (A) providing a harness including a metal wire, a connector at a terminal of the metal wire, including a flat portion made of a metal plate, and a block of lead-free solder, containing tin as a major component, soldered on the flat portion of the connector; (B) providing a glass substrate layer over which a conductive layer, including an electrically conductive wire pattern and a connecting terminal, is formed; (C) sandwiching the block between the flat portion of the connector and the connecting terminal of the conductive layer, and then melting the block to form a solder connection between the connector and the connecting terminal; wherein the amount of the lead-free solder is between 4 mg and 13 mg.

20 Claims, 4 Drawing Sheets

(51) Int. Cl.
  *C22C 13/00*   (2006.01)
  *H01R 4/62*   (2006.01)
  *H01R 12/53*   (2011.01)
  *H01R 12/57*   (2011.01)
  *H01R 43/02*   (2006.01)
  *H05B 3/84*   (2006.01)
  *H01Q 1/12*   (2006.01)
  *H01Q 1/36*   (2006.01)

(52) U.S. Cl.
  CPC ............. *H01R 4/625* (2013.01); *H01R 12/53* (2013.01); *H01R 12/57* (2013.01); *H01R 43/02* (2013.01); *H05B 3/84* (2013.01); *H01Q 1/1278* (2013.01); *H01Q 1/364* (2013.01); *H05B 2203/016* (2013.01); *H05B 2203/017* (2013.01)

(58) Field of Classification Search
  CPC ......... C22C 13/00; C22C 19/03; H01R 4/625; H01R 12/53; H01R 12/57; H01R 43/02; H01R 4/024; H05B 3/84; H05B 2203/016; H05B 2203/017; H01Q 1/1278; H01Q 1/364; B22F 7/08
  USPC ............................ 228/245–262, 179.1–180.1
  See application file for complete search history.

(56) References Cited

U.S. PATENT DOCUMENTS

| | | | | | |
|---|---|---|---|---|---|
| 3,813,519 | A | * | 5/1974 | Jochim | H01C 17/16 338/217 |
| 4,634,041 | A | * | 1/1987 | Prasad | H01R 43/02 228/124.1 |
| 4,877,176 | A | * | 10/1989 | Kubis | H05K 3/3447 228/180.1 |
| 5,011,066 | A | * | 4/1991 | Thompson | H01L 24/81 257/E21.511 |
| 5,110,761 | A | * | 5/1992 | Kalfus | H01L 23/49562 228/123.1 |
| 5,172,852 | A | * | 12/1992 | Bernardoni | H05K 1/111 228/180.21 |
| 5,879,206 | A | * | 3/1999 | Badgley | H05B 3/84 228/114.5 |
| 6,125,043 | A | * | 9/2000 | Hauer | H01L 24/81 174/257 |
| 6,169,253 | B1 | * | 1/2001 | Jairazbhoy | H05K 3/3442 361/767 |
| 6,316,736 | B1 | * | 11/2001 | Jairazbhoy | H05K 1/111 174/250 |
| 6,730,848 | B1 | * | 5/2004 | Antaya | B23K 1/0008 174/94 R |
| 7,416,106 | B1 | * | 8/2008 | Downes | B23K 1/0016 228/248.1 |
| 7,658,001 | B1 | * | 2/2010 | Houk | B23K 1/0016 228/256 |
| 8,210,422 | B2 | * | 7/2012 | Zadesky | H01R 4/024 228/225 |
| 8,816,214 | B2 | | 8/2014 | Ziegler et al. | |
| 9,612,386 | B2 | | 4/2017 | Berard et al. | |
| 2005/0045700 | A1 | * | 3/2005 | Winter | C03C 17/3673 228/246 |
| 2009/0250507 | A1 | * | 10/2009 | Huang | H05K 3/363 228/56.5 |
| 2013/0043066 | A1 | | 2/2013 | Cholewa et al. | |
| 2015/0236431 | A1 | | 8/2015 | Schmalbuch et al. | |
| 2015/0264800 | A1 | | 9/2015 | Schmalbuch et al. | |
| 2016/0071814 | A1 | | 3/2016 | Kroener | |
| 2019/0123457 | A1 | * | 4/2019 | Bulgajewski | H05K 1/0212 |
| 2019/0357316 | A1 | * | 11/2019 | Douma | B60J 1/002 |
| 2020/0045780 | A1 | * | 2/2020 | Sitterlet | B60S 1/026 |
| 2023/0084191 | A1 | * | 3/2023 | Snider | H05B 3/84 296/146.16 |
| 2023/0093829 | A1 | * | 3/2023 | Ogura | H01R 4/023 374/185 |
| 2023/0173893 | A1 | * | 6/2023 | Sase | H05B 3/86 219/203 |

FOREIGN PATENT DOCUMENTS

| | | | | | |
|---|---|---|---|---|---|
| CA | 3054395 | A1 | * | 3/2019 | ......... B23K 35/0244 |
| CA | 3082979 | A1 | * | 6/2019 | ........... B23K 1/0016 |
| CN | 102972092 | A | * | 3/2013 | ............. B23K 1/002 |
| CN | 104620673 | A | | 5/2015 | |
| CN | 105405824 | A | | 3/2016 | |
| CN | 109500510 | A | * | 3/2019 | ........... B23K 35/025 |
| CN | 109648222 | A | | 4/2019 | |
| CN | 111886108 | A | * | 11/2020 | ................ B22F 7/08 |
| DE | 4439645 | C1 | * | 4/1996 | .............. H01R 4/023 |
| DE | 102007059818 | B3 | * | 4/2009 | ....... B23B 17/10036 |
| EP | 0634882 | A2 | * | 1/1995 | |
| EP | 964607 | A1 | * | 12/1999 | ........... H05K 3/3442 |
| EP | 964609 | A1 | * | 12/1999 | ............. H05K 1/111 |
| EP | 2219056 | A1 | | 8/2010 | |
| FI | 75718 | B | * | 3/1988 | |
| JP | 63302594 | A | * | 12/1988 | |
| JP | 2001251119 | A | * | 9/2001 | ........... H01Q 1/1271 |
| JP | 2003521093 | A | | 7/2003 | |
| JP | 2004189023 | A | * | 7/2004 | ................ H05B 3/84 |
| JP | 2005303079 | A | * | 10/2005 | ........... B23K 1/0016 |
| JP | 2016505195 | | | 2/2016 | |
| JP | 2016117638 | A | | 6/2016 | |
| JP | 2018520875 | A | * | 8/2018 | |
| JP | 2019525409 | A | * | 9/2019 | |
| WO | 01/56334 | A1 | | 8/2001 | |
| WO | WO-2007116088 | A1 | * | 10/2007 | ....... B32B 17/10036 |
| WO | WO-2012152542 | A1 | * | 11/2012 | ........... B23K 1/0004 |
| WO | WO-2012152544 | A1 | * | 11/2012 | ........... B23K 1/0004 |
| WO | WO-2013182394 | A1 | * | 12/2013 | ........... B23K 1/0004 |
| WO | 2014040774 | A1 | | 3/2014 | |
| WO | WO-2014079595 | A1 | * | 5/2014 | ............... H05B 3/06 |
| WO | WO-2015023936 | A1 | * | 2/2015 | ........... B23K 1/0008 |
| WO | 2015118279 | A1 | | 8/2015 | |
| WO | WO-2016096248 | A1 | * | 6/2016 | ............ H01B 7/0216 |
| WO | WO-2017010493 | A1 | * | 1/2017 | ........... B23K 1/0008 |
| WO | WO-2017194261 | A1 | * | 11/2017 | ............... B23K 3/02 |
| WO | WO-2018020082 | A1 | * | 2/2018 | ............ B23K 35/262 |
| WO | WO-2019092947 | A1 | * | 5/2019 | ............... B23K 1/00 |
| WO | WO-2019181394 | A1 | * | 9/2019 | ........... B23K 35/025 |
| WO | WO-2019181395 | A1 | * | 9/2019 | ................ B22F 7/08 |
| WO | WO-2019235266 | A1 | * | 12/2019 | .............. B60J 1/002 |
| WO | WO-2020050120 | A1 | * | 3/2020 | .............. B23K 35/26 |
| WO | WO-2020123626 | A1 | * | 6/2020 | .............. B23K 3/087 |

OTHER PUBLICATIONS

Japanese Office Action and English Translation for related Japanese Application No. 2020-548838; action dated Jul. 7, 2022; (6 pages).
International Search Report and the Written Opinion for International application No. PCT/JP2019/007427, filed Feb. 27, 2019, mailed on May 15, 2019 by European Patent Office, 17 pages.
Siewert, et al., "Database for Solder Properties with Emphasis on New Lead-free Solders", Properties of Lead-free Solders, Release 4.0, National Institute of Standards and Technology & Colorado School of Mines, Feb. 11, 2002, pp. 1-77. URL: http://www.msed.nist.gov/solder/NIST_LeadfreeSolder_v4.pdf.
Office Action for related Japanese application No. 2020-548838; action dated Dec. 8, 2022; (8 pages).
Office Action Issued in Chinese Patent Application No. 201980020827.X, mailed on Jun. 30, 2021, 6 pages.
European Examination Report from corresponding European Patent Application No. 17713793.2, mailed Jan. 2, 2024. 5 pages.

* cited by examiner

METHOD OF PRODUCING A VEHICLE GLASS ASSEMBLY

CROSS REFERENCE TO RELATED APPLICATIONS

This application is a national stage of PCT International Application No. PCT/JP2019/007427, filed Feb. 27, 2019, and claims priority to GB Patent Application No. 1804622.7 filed Mar. 22, 2018, entitled "Method Of Producing A Vehicle Glass Assembly," the contents of both are incorporated by reference herein in their entireties.

TECHNICAL FIELD

The invention relates to a vehicle glass assembly comprising a glass substrate layer, an electrically conductive layer over the glass substrate layer, and a harness connected to the conductive layer via a lead-free solder.

BACKGROUND ART

A vehicle glass assembly comprising a glass substrate layer, an electrically conductive layer applied over the window glass, and a harness connected to the conductive layer has been used as a vehicle glass window. Although the harness has been connected to the conductive layer by soldering the conductive layer and an electrical connector of the harness with a lead-containing solder, the End of Life Vehicles Directive 2000/53/EC urges the use of lead-free solders instead.

The use of lead-free solders has led to difficulties in compensating mechanical stresses between the glass substrate layer and the electrical connector, resulting in the occurrence of cracks in the vehicle glass assembly. The mechanical stress may be affected by a junction structure consisting of the solder, the conductive layer and electrical connector. In order to solve the problem, US Patent Application Publications 2015/0236431 and 2015/0264800 disclose glass assemblies having a glass substrate layer and an electrical connection using a connection element made of chromium-containing steel. The connection element has a region which is crimped about a wire cable and connected to the conductive layer, over the glass substrate layer, using lead-free solder.

SUMMARY OF INVENTION

Technical Problem

US Patent Application Publications 2015/0236431 and 2015/0264800 assume that the shape and the material of the connection element are of critical significance with regard to avoiding mechanical stress due to thermal history. According to those prior art documents, the connector made of chromium-containing steel seems to match thermal expansion between the glass substrate layer and the connector better than a copper-based connector, resulting in a reduction of mechanical stress. Although the connector made of chromium-containing steel might bring less mechanical stress than a copper-based connector, the factors to reduce the occurrence of cracks in the window glass are still unclear.

Solution to Problem

It is an aim herein to provide new and useful methods for producing vehicle glass assemblies comprising an electrically conductive layer over a glass substrate layer, and in which an electrical connector is soldered by lead-free solder onto the conductive layer.

According to one aspect of the present invention, there is provided a method of producing a vehicle glass assembly, comprising the following steps:

a step (A) of providing a harness comprising
a metal wire,
a connector comprising a flat portion made of a metal plate, disposed at a terminal of the metal wire, and
a block of lead-free solder containing tin as a major component and soldered on the flat portion;

a step (B) of providing a glass substrate layer over which a conductive layer, comprising an electrically conductive wire pattern and a connecting terminal, is formed;

a step (C) of sandwiching the block between the flat portion and the connecting terminal, and then melting the block to form a solder connection between the connector and the connecting terminal;

wherein the amount of the lead-free solder is between 4 mg and 13 mg, wherein the block on the flat portion is away from all edges of the flat portions, wherein all lead-free solder is disposed between the flat portion and the connecting terminal in the solder connection.

Advantageous Effects of Invention

We find that when producing vehicle glass assemblies using the above method, mechanical stress between the glass substrate layer and the electrical connector can be relaxed or reduced, and crack occurrence in the glass substrate layer decreased.

DESCRIPTION OF EMBODIMENTS

In the following description, for purposes of explanation and not limitation, specific details are set forth in order to provide an understanding of certain embodiments of the present invention. However, it will be apparent to those skilled in the art that the present invention may be practiced in other embodiments that depart from these specific details. In other instances, detailed descriptions of well-known devices, processes, techniques, and methods are omitted so as not to obscure the description with unnecessary detail. We refer now more particularly to the accompanying drawings, in which like reference numerals indicate like parts/elements throughout the several views.

Figure 1:
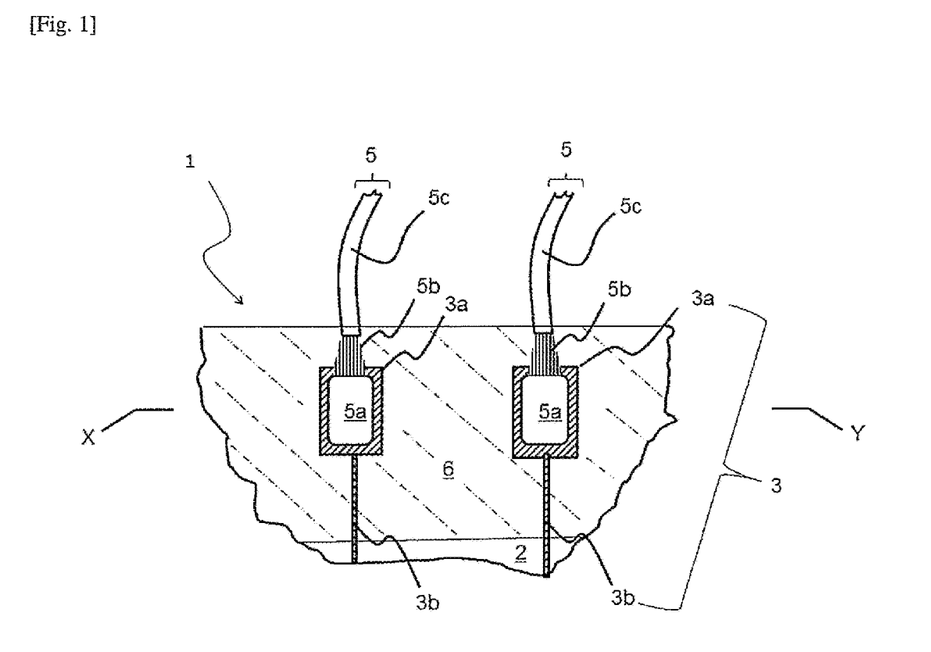
FIG. 1 is a schematic view showing the main components of a vehicle glass assembly as made by the present invention.
Figure 2:
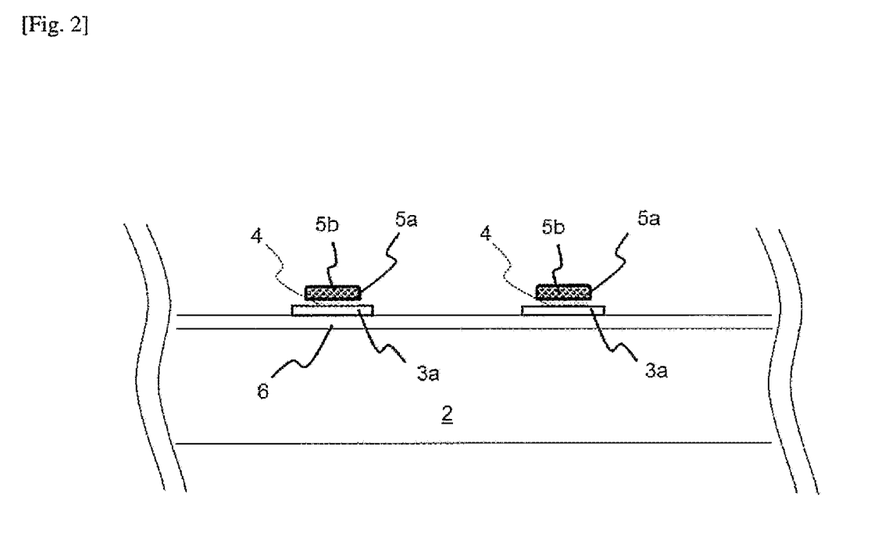
FIG. 2 is a cross-sectional view at X-Y of FIG. 1.
Figure 3:
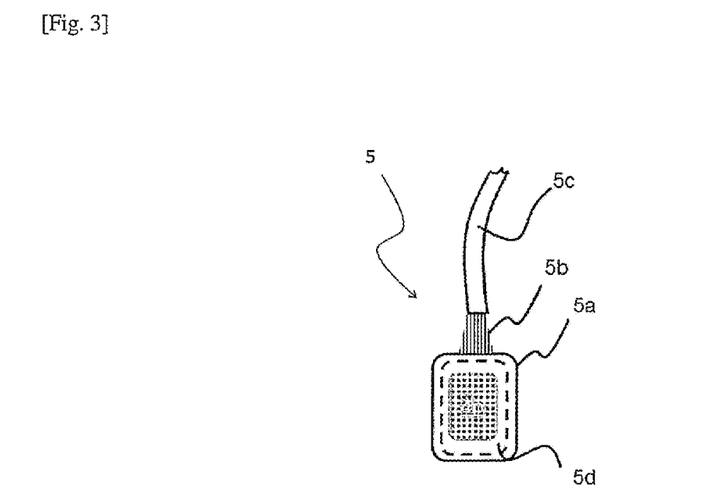
FIG. 3 is a schematic view showing a harness provided after step (A)
Figure 4:
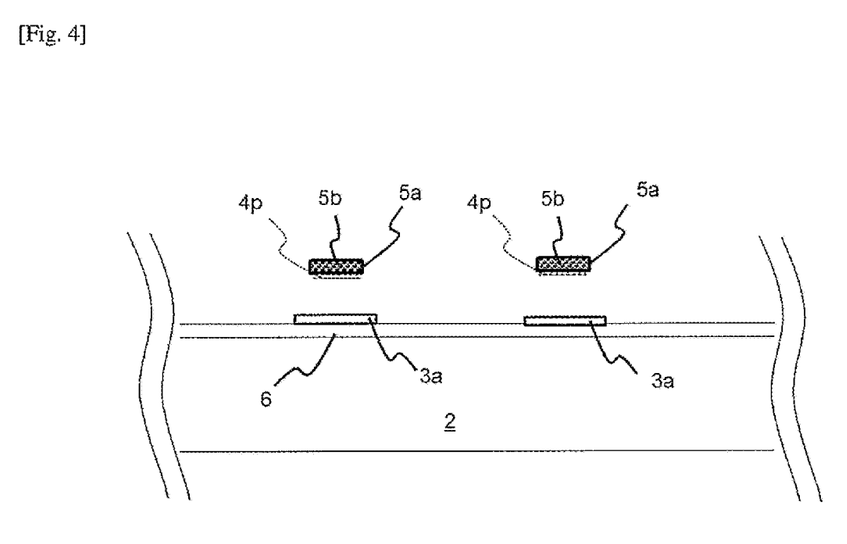
FIG. 4 is a cross-sectional view showing a harness and a glass substrate layer in the state before step (C), and the cross-sectional view corresponding to the X-Y cross-sectional view of FIG. 1.

For better understanding of the present invention, the present invention is described using figures. FIG. 1 is a schematic view of an embodiment of vehicle glass assembly made by the present invention. FIG. 2 shows the cross-section of FIG. 1 at X-Y. In accordance with typical embodiments of the present invention, a vehicle glass assembly 1 comprises a glass substrate layer 2, an optional coloured ceramic band 6 sintered on a peripheral portion of the glass substrate layer 2, an electrically conductive layer 3 which comprises a connecting terminal 3a and an electrically conductive wire pattern 3b sintered on the glass substrate layer 2 and/or on the coloured ceramic band 6, a lead-free solder layer 4 on the conductive layer 3, and a harness 5 which comprises a connector 5a made of a metal plate, metal wire 5b such as copper wire, and an envelope or sheath 5c covering the metal wire. A solder connection is formed between the connector 5a and the electrically conductive layer 3 via the lead-free solder layer 4. FIGS. 3 and 4 relate to steps (A), (B) and (C), and details are described below.

The vehicle glass assembly 1 is produced by a production method comprising:

(A) providing a harness 5 comprising the metal wire 5b, the connector 5a comprising the flat portion 5d made of a metal plate disposed at a terminal of the metal wire 5b, and the block 4p made of lead-free solder containing tin as major component, soldered on the flat portion 5d;

(B) providing the glass substrate layer 2 over which the conductive layer 3, comprising the electrically conductive wire pattern 3b and a connecting terminal 3a, is formed, and (C) sandwiching the solder block 4p between the flat portion 5d and the connecting terminal 3a and then melting the block 4p to form a solder connection, forming the lead-free solder layer 4 between the connector 5a and the connecting terminal 3a;

wherein the amount of the lead-free solder is between 4 mg and 13 mg, wherein the block 4p on the flat portion 5d is away from all edges of the flat portions 5d, wherein all lead-free solder is disposed between the flat portion 5d and the connecting terminal 3a in the solder connection.

If the amount of lead-free solder is smaller than 4 mg, it becomes difficult to achieve enough soldered area at the connecting terminal 3a, resulting in a weaker solder connection. On the other hand, if the amount is larger than 13 mg, the compensation of mechanical stresses between the glass substrate layer 2 and the connector 5a may be inadequate, resulting in the occurrence of cracks in the glass substrate layer 2, the conductive layer 3, and/or in the coloured ceramic band 6. In the light of these factors, the amount may typically be between 4 mg and 11 mg, preferably between 4.5 mg and 10 mg.

In the solder connection, if the lead-free solder is spilled out from a space between the flat portions 5d and the connecting terminal 3a, such structure may provide a mechanical stress between the glass substrate layer and the electrical connector. Therefore, not only the block amount but also soldered position on the flat portion 5d at the step A) is important. Thus, at the step (A), the harness 5 in which the block 4p is soldered onto the flat portion 5d so as to be away from all edges of the flat portion 5d is used. Through the steps, the vehicle glass assembly 1 comes to comprise solder connection in which all lead-free solder is disposed between the flat portions 5d and the connecting terminal 3a. Further, the vehicle glass assembly 1 may comprise solder connection in which all lead-free solders recess from all edges of the flat portion 5d, in order that the lead-free solder is certainly not spilled out from the space.

FIG. 3 is a schematic view showing a harness in the state after step (A). The block 4p made of lead-free solder is soldered onto the flat portion 5d of the connector 5a. The flat portion 5d is made of metal plate; preferably in general the entire connector may be made of a single metal plate. The connector 5a is disposed at the terminal of the metal wire 5b, and the metal wire 5b is connected to at least the flat portion 5d. The metal wire 5b may be crimped with the connector 5a that is preferably a B-crimp. The metal wire 5b—which in practice may be a bundle of plural wires—is typically covered with the envelope or sheath 5c which may be made of e.g. PVC, PE, rubber material, fluororesin or the like. It is generally to be connected to apparatus such as an amplifier, audio equipment, radio equipment, a television, a navigation system, or the like.

The area of the flat portion 5d may typically be between 10 mm$^2$ and 15 mm$^2$. If the area is smaller than 10 mm$^2$ the solder connection may become weak. On the other hand, the more the area is larger than about 15 mm$^2$, the more mechanical stress tend to be transferred to the glass substrate layer 2 (due to brittleness of the lead-free solder and differential thermal expansion coefficients among the glass substrate layer 2, the lead-free solder layer 4 and the connector 3a). In the light of these factors, the area may desirably be between 10 mm$^2$ and 15 mm$^2$, more preferably between 11 mm$^2$ and 14 mm$^2$ The thickness of the metal plate may also affect the melting process of the block 4p in step (C). The thicker the metal plate, the more heating energy is required when the melting process is carried out and this may lead to more mechanical stress in the solder connection. On the other hand, the less thick the metal plate, the more difficult the connector 3a is for handling and manufacture. In the light of these factors, the thickness of the metal plate may preferably be between 0.2 mm and 0.4 mm, more preferably between 0.25 mm and 0.35 mm, still more preferably about 0.3 mm.

The shape of the flat portion 5d may be a rectangle, a square, oval or circle etc. As an example of the material of the metal plate, there can be mentioned Cu or Cu alloy, Fe alloy comprising Ni or Cr such as INVAR 48 (FeNi48, consisting of 48% nickel in iron alloy). Among these materials, Fe alloy is preferable, and INVAR 48 is the most preferable.

In step (A), the lead-free solder is soldered onto the flat connector portion 5d to form the block 4p. The volume of the block 4p may typically be between 0.6 mm$^3$ and 2 mm$^3$. If the volume is smaller than 0.6 mm$^3$, the solder connection may sometimes become weak. On the other hand, if the volume is larger than 2 mm$^3$, the compensation of mechanical stresses between the glass substrate layer 2 and the connector 5a may sometimes be inadequate, resulting in the occurrence of cracks in the glass substrate layer 2, the conductive layer 3, and/or in the coloured ceramic band 6. In the light of these factors, the volume may desirably be between 0.6 mm$^3$ and 1.8 mm$^3$, more preferably between 0.6 mm$^3$ and 1.4 mm$^3$.

The thickness of the block 4p may also affect the quality of the lead-free solder layer 4. If there is a limited amount of the lead-free solder, an inappropriate thickness of the block 4p may result in an inhomogeneous layer 4 with porosity which may cause mechanical stress in the glass substrate layer 2. Considering these factors, the thickness may typically be between 0.2 mm and 0.4 mm, preferably between 0.2 mm and 0.35 mm.

The lead-free solder contains tin as a major component. As examples of lead-free solder, there can be mentioned Sn—Ag based solder, Sn—Ag—Cu based solder and the like. The content of Sn may be e.g. 95 mass % to 99 mass %, preferably 96 mass % to 98 mass %. The content of Ag may be e.g. 1 mass % to 5 mass %, preferably 2 mass % to 4 mass %. The content of Cu may be e.g. 0 mass % to 1.5 mass %, preferably 0.1 mass % to 1 mass %.

FIG. 4 is a cross-sectional view showing the harness and a glass substrate layer before step (C); the cross-sectional view is at X-Y of FIG. 1. By means of step (B), the glass substrate layer 2 comprising the conductive layer 3 is provided. The glass substrate layer optionally comprises the coloured ceramic band 6 between the glass substrate layer 2 and the conductive layer 3. The glass substrate layer 2 preferably has a curved shape, obtainable e.g. by a known process of bending a flat glass sheet. The glass substrate layer 2 may be a non-tempered glass, a thermally tempered glass, a chemically tempered glass or a laminated glass. In the laminated glass, the two glasses are preferably non-tempered glasses. This invention can specially be applied to a case in which the glass substrate layer 2 is a laminated glass comprising two or more non-tempered glasses (i.e. all glasses are non-tempered glasses) and the conductive layer 3 is a hot printed wire. As the material of the glass substrate layer 2, soda-lime silicate glass as defined by ISO16293-1 can be used. The soda-lime silicate glass may comprise a colorant such as iron oxide and cobalt oxide, whereby to present a colour such as pale green, dark green, pale gray, dark gray, pale blue or dark blue.

The coloured ceramic band 6 is of a coloured ceramic composition preferably comprising an inorganic heat-resisting pigment and a glass frit that has a lower softening temperature than that of the glass substrate layer 2. Such a peripheral band is well-known, and is sometimes called a frit layer, ceramic band or paint band. The coloured ceramic band 6 is used to overlie an adhesion area between the vehicle glass assembly 1 and a body flange of a vehicle. It can improve weather resistance of the adhesion area and/or make it invisible by covering it, so that black is preferable as the colour of the coloured ceramic band layer 6. The thickness of the coloured ceramic band may be e.g. 5 μm to 25 μm, preferably 5 μm to 15 μm.

The coloured ceramic band 6 can be obtained for example by the following process. That is, a ceramic paste comprising the inorganic heat-resisting pigment, a glass frit and organic solvent is applied on the peripheral portion of the glass substrate layer 2 by a screen printing method or the like, and then heated, thereby volatilizing the organic solvent. Subsequently, the composition comprising the inorganic heat-resisting pigment and glass fit is sintered on the glass substrate layer thereby forming the coloured ceramic band 6.

The inorganic heat-resisting pigment is mixed in the colour ceramic to give a desired color. The grain diameter of the inorganic heat-resisting pigment may be e.g. 0.1 μm to 10 μm, preferably 0.2 μm to 5 μm, expressed as a D50 value. As the inorganic heat-resisting pigment, known ones can be used. As examples of black pigments, there can be mentioned copper-chromium complex oxide, iron-manganese complex oxide, cobalt-iron-manganese complex oxide, copper-chromium-manganese complex oxide, magnetite and the like.

As examples of blue pigment, there can be mentioned cobalt blue, chromium green, cobalt-zinc-nickel-titanium complex oxide, cobalt-aluminum-chromium complex oxide and the like.

In addition to the above-mentioned, there can be used white pigment (e.g. titanium white, zinc oxide and the like), red pigment (e.g. rouge and the like), yellow pigment (e.g. titanium yellow, titanium-barium-nickel complex oxide, titanium-antimony-nickel complex oxide, titanium-antimony-chromium complex oxide and the like) and other pigments in line with the skilled person's knowledge.

The glass frit is fused through a heating process to form the coloured ceramic band 6. As the glass frit, usual ones can be used. As an example of the glass frit, there can be mentioned borosilicate glass, boron-zinc-silicate glass, bismuth-based glass and the like. A softening temperature of the glass frit may be a lower temperature, for example, 300-600° C., preferably 350-580° C., than a bending and forming temperature of the glass substrate layer 2. The grain diameter of the glass frit may be 0.1 μm to 10 μm, preferably 0.2 μm to 5 μm, further preferably 1 μm to 4 μm (determined as D50). In the coloured ceramic band 6, the content of the glass material made of the glass frit may be 60 mass % to 80 mass %.

The coloured ceramic band 6 can be also obtained through other methods besides the above-mentioned process. As an example of such other processes, there can be mentioned a digital printing process.

The conductive layer 3, preferably sintered on the glass substrate layer 2 and/or on the coloured ceramic band 6, comprises the electrically conductive wire pattern 3b and the connecting terminal 3a. The conductive layer 3 preferably comprises silver metal (silver or silver alloy) and a glass frit which may be selected from those exemplified above. The thickness of the electrically conductive layer 3 may be e.g. 3 μm to 20 μm, preferably 5 μm to 15 μm, more preferably 12 μm to 17 μm.

The conductive layer 3 can be obtained through the following process. That is, a silver paste comprising the silver metal, the glass frit and an organic solvent is applied on the glass substrate layer 2, or on coated and dried ceramic colour paste by screen printing method and the like, and then is heated, thereby volatilizing the organic solvent. Subsequently, the composition comprising the silver metal and the glass frit is sintered on the glass substrate layer 2 or coloured ceramic band 6, thereby forming the electrically conductive layer 3. As is well-known, the conductive layer 3 can be used as a printed hot-wire such as a defogger and defroster, or as an antenna.

The grain diameter of the silver metal may be e.g. 0.1 μm to 10 μm, preferably 0.2 μm to 7 μm (determined as D50). In the electrically conductive layer 3, the content of the silver metal may be e.g. 65 mass % to 99 mass %, preferably 75 mass % to 98 mass %.

The conductive layer 3 can be also obtained by other methods besides the above-mentioned process. As an example of such other processes, there can be mentioned a digital printing process.

By means of step (C), the desired vehicle glass assembly 1 is obtained. In step (C), the block 4p is sandwiched between the flat portion 5d and the connecting terminal 3a, and then the block 4p is melted and may be pressed therebetween to form a solder connection between the connector 5a and the connecting terminal 3a, forming the lead-free solder layer 4. Through this process, the lead-free solver layer 4 may be thinner than the block 4p in thickness, In the process (reflow process) in which the block 4p is melted, the block 4p may be heated up from a melting temperature of the lead-free solder to 50° C. above the melting temperature. The reflow process may be carried out using a soldering iron or electrical heating of the connector 5a. It is preferable that the reflow process is carried out through the electrical heating of the connector 5a.

The thickness of the lead-free solder layer 4 is desirably between 0.1 mm and 0.3 mm. If the thickness is more than 0.3 mm, a difference of thermal expansion behavior between the glass substrate layer 2 and the solder layer 4 may cause mechanical stress at an interface of the glass substrate layer 2 or the electrically conductive layer 3 during the melting process, or while using the window glass 1 fitted in a vehicle. The mechanical stress may enhance a risk of permanent tensile stress in the glass substrate layer 2, resulting in crack generation in the glass substrate layer 2. On the other hand, if the thickness is less than 0.1 mm it may enhance a risk of a generation of hot spots at the solder layer during the reflow process. The generation of hot spots may result in a residual stress in the glass substrate layer 2, which then causes cracking in the glass substrate layer 2.

Considering all these factors, the thickness of the lead-free solder layer 4 is preferably between 0.15 mm and 0.25 mm.

EXPERIMENTAL

Example 1

A base test specimen was provided. The specimen comprises a non-tempered glass substrate layer 2 with 3 mm thickness and made of a soda-lime silicate glass defined by ISO16293-1, and a conductive layer 3 comprising an electrically conductive wire pattern 3b and a connecting terminal 3a as shown in FIGS. 1, 2 and 4. The shape and area of the connecting terminal 3a was, respectively, a rectangle and 15 mm$^2$. This corresponds to step (B) of the method.

A harness 5 comprising a connector 5a, metal (copper) wire 5b and a PVC sheath 5c covering the wire 5b was provided as shown in FIGS. 1 to 4. The connector 5a was made of Invar 48 (FeNi48 alloy) metal plate with 0.3 mm thickness, and was a B-crimp clamping the metal wire 5b. The connector 5a had a flat portion 5d of rectangular shape and 11.25 mm$^2$ area. A lead-free solder made of Sn (96.5 mass %)-Ag (3.0 mass %)-Cu (0.5 mass %) was soldered onto the flat portion 5d to form block 4p, The 4p on the flat portion 5d was away from all edges of the flat portions 5d. In this example, the soldered amount was 7.5 mg, and the volume and thickness of the block 4p were respectively 1.012 mm$^3$ and 0.2 mm. This corresponds to step (A) of the method.

The block 4p was placed on the connecting terminal 3a so as to be sandwiched between the flat portion 5d and the connecting terminal 3a. The connecting terminal 3a was electrically heated so that block 4p is melted to form a solder connection between the connector and the connecting terminal. This corresponds to step (C) of the method. Through the step (C), the lead-free solder did not spill out a space between the flat portions 5d and the connecting terminal 3a, In this experiment, the soldered specimen was taken to be the vehicle glass assembly 1.

The following heat cycle tests were conducted for 10 samples made in accordance with Example 1.

(1) 20 times repeat of alternate cycling from −40° C. to +80° C. over 12 hours.

(2) Holding each sample at −40° C. for 4 hours and at +80° C. for 4 hours, with 80% controlled humidity at positive temperatures and uncontrolled humidity at negative temperatures.

No cracks were observed in the glass substrate layer 2 for any of the 10 samples in the heat cycle tests.

Example 2

The procedure of Example 1 was repeated with the exception that the amount of lead-free solder was 8.8 mg, and the volume and thickness of the block 4p were respectively 1.196 mm$^3$ and 0.2 mm. No cracks were observed in the glass substrate layer 2 for any of the samples in the heat cycle tests.

Example 3

The procedure of Example 1 was repeated with the exception that the amount of lead-free solder was 4.8 mg, and the volume and thickness of the block 4p were respectively 0.65 mm$^3$ and 0.2 mm. No cracks were observed in the glass substrate layer 2 for any of the samples in the heat cycle tests.

Comparative Example 1

The procedure of Example 1 was repeated with the exception that the amount of lead-free solder was 32.5 mg, and the volume and thickness of the block 4p were respectively 4.4 mm$^3$ and 0.5 mm. In the heat cycle tests cracking was observed for 7 out of 10 samples in this comparative example.

Comparative Example 2

The procedure of Example 1 was repeated with the exception that the amount of lead-free solder was 14 mg, and the volume and thickness of the block 4p were respectively 1.9 mm$^3$ and 0.2 mm. Cracking was observed for 4 out of 10 of samples in this comparative example.

The invention claimed is:

1. A method of producing a vehicle glass assembly, comprising:
   (A) providing a harness comprising
      a metal wire,
      a connector at a terminal of the metal wire, comprising a flat portion made of a metal plate, the metal plate comprising
         an upper face,
         a lower face, and
         at least one side edge, and
      a block of lead-free solder, containing tin as a major component, soldered on the flat portion of the connector;
   (B) providing a glass substrate layer over which a conductive layer, comprising an electrically conductive wire pattern and a connecting terminal, is formed;
   (C) sandwiching the block between the flat portion of the connector and the connecting terminal of the conductive layer, and then melting the block to form a lead-free solder layer by solder connection between the connector and the connecting terminal;
   wherein the amount of the lead-free solder is between 4 mg and 13 mg, the block on the flat portion is away from all side edges of the flat portions after melting, such that a gap exists along a border between the block and all side edges of the flat portion, and all lead-free solder is disposed between the flat portion and the connecting terminal in the solder connection.

2. The production method according to claim 1, wherein the amount of the lead-free solder is between 4.5 mg and 10 mg.

3. The production method according to claim 1, wherein the area of the flat portion is between 10 mm$^2$ and 15 mm$^2$.

4. The production method according to claim 1, wherein the thickness of the metal plate is between 0.2 mm and 0.4 mm.

5. The production method according to claim 1, wherein the connector is a B-crimp clamping the metal wire.

6. The production method claim 1, wherein the volume of the block is between 0.6 mm³ and 2 mm³.

7. The production method according to claim 1, wherein the thickness of the block is between 0.2 mm and 0.4 mm.

8. The production method according to claim 1, wherein the conductive layer is a printed hot-wire and the glass substrate layer is of non-tempered glass.

9. The production method according to any one of claim 1, wherein all lead-free solder recesses from all edges of the flat portion.

10. The production method according to claim 1, wherein the shape of the flat portion is a rectangle, a square, an oval, or a circle.

11. The production method according to claim 1, wherein the metal plate is made of Cu, a Cu alloy, or an Fe alloy comprising Ni or Cr.

12. The production method according to claim 1, wherein the lead-free solder contains tin as a major component.

13. The production method according to claim 1, wherein the lead-free solder is an Sn-Ag based solder or an Sn-Ag-Cu based solder.

14. The production method according to claim 13, wherein the lead-free solder contains 95-99 mass % of Sn, 1-5 mass % of Ag, and 0-1.5 mass % of Cu.

15. The production method according to claim 1, wherein the lead-free solder layer is thinner than the block in thickness.

16. The production method according to claim 1, wherein the block is melted in the step (C) by using a soldering iron or by electrical heating of the connector.

17. The production method according to claim 1, wherein the lead-free solder layer has a thickness that is between 0.1 mm to 0.3 mm.

18. A method of producing a vehicle glass assembly, comprising:
(A) providing a harness comprising
a metal wire,
a connector at a terminal of the metal wire, comprising a flat portion made of a metal plate, the metal plate comprising
an upper face,
a lower face, and
at least one side edge, and
a block of lead-free solder, containing tin as a major component, soldered on the flat portion of the connector;
(B) providing a glass substrate layer over which a conductive layer, comprising an electrically conductive wire pattern and a connecting terminal, is formed;
(C) sandwiching the block between the flat portion of the connector and the connecting terminal of the conductive layer, and then melting the block to form a lead-free solder layer by a solder connection between the connector and the connecting terminal;
wherein the amount of the lead-free solder is between 4.5 mg and 10 mg,
wherein the block on the flat portion is away from all side edges of the flat portions after melting, such that a gap exists along a border between the block and all side edges of the flat portion,
wherein all lead-free solder is disposed between the flat portion and the connecting terminal in the solder connection,
wherein the area of the flat portion is between 10 mm² and 15 mm²,
wherein the thickness of the metal plate is between 0.2 mm and 0.4 mm,
wherein the connector is a B-crimp clamping the metal wire,
wherein the volume of the block is between 0.6 mm³ and 2 mm³,
wherein the thickness of the block is between 0.2 mm and 0.4 mm,
wherein the conductive layer is a printed hot-wire and the glass substrate layer is of non-tempered glass,
wherein all lead-free solder recesses from all side edges of the flat portions.

19. The production method according to claim 18, wherein the lead-free solder is an Sn-Ag based solder or an Sn-Ag-Cu based solder.

20. The production method according to claim 18, wherein the lead-free solder contains 95-99 mass % of Sn, 1-5 mass % of Ag, and 0-1.5 mass % of Cu.

* * * * *